May 12, 1925.
D. DE ANGULO
FEEDING FOUNTAIN FOR POULTRY
Filed June 6, 1924
1,537,337
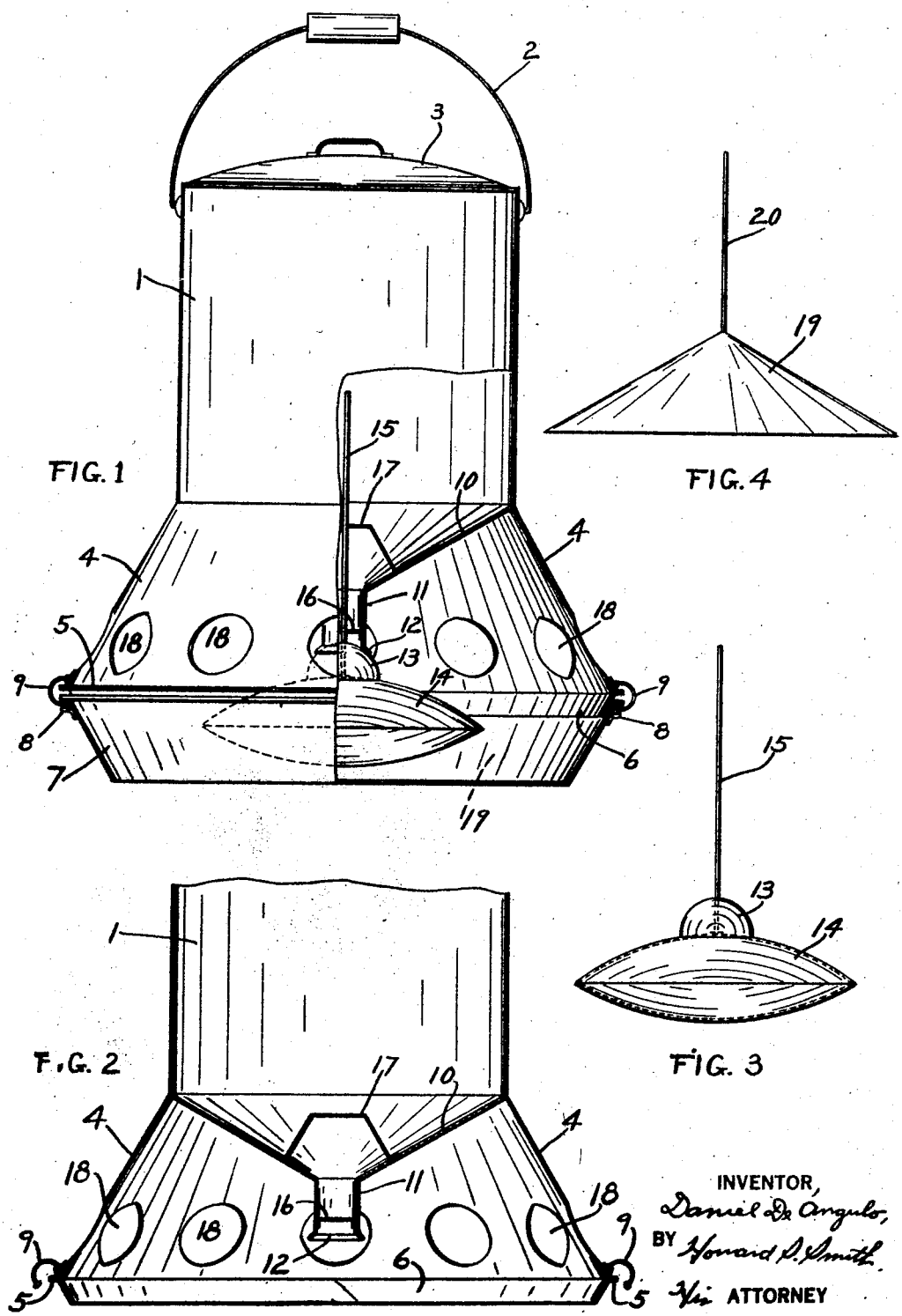

Patented May 12, 1925.

1,537,337

UNITED STATES PATENT OFFICE.

DANIEL DE ANGULO, OF NEAR DAYTON, OHIO.

FEEDING FOUNTAIN FOR POULTRY.

Application filed June 6, 1924. Serial No. 718,401.

*To all whom it may concern:*

Be it known that I, DANIEL DE ANGULO, a citizen of the United States, residing in the county of Montgomery, near the city of Dayton, and State of Ohio, have invented certain new and useful Improvements in Feeding Fountains for Poultry, of which the following is a specification.

This invention relates to new and useful improvements in feeding fountains for poultry, and has particular reference to a fountain for feeding buttermilk and dry mash to chicks.

It is one of the principal objects of my invention to provide an economical, efficient and conveniently handled device for feeding liquids to poultry, and particularly buttermilk to chicks, through holes into which they project their heads.

It is another object of my invention to provide such a device that is constructed to receive a dry feed cone in the place of the regular float, when it is desired to use the tank for dry feeding.

Other important and incidental objects will be brought out in the following specification, and particularly set forth in the subjoined claims.

In the accompanying drawings, Figure 1 is a side elevational view, partly in section, of my device when used as a fountain for feeding chicks. Figure 2 is sectional view taken through the lower part of the tank. Figure 3 is a side view of the float. And Figure 4 is a side view of the dry feed cone.

Referring to the accompanying drawings for a detailed description of my invention, I employ a suitable container such as the cylindrical tank 1 to the upper exterior portion of which a handle 2 is attached. This tank 1 is closed at its upper end by a removable cover 3, and at its lower end it terminates in an outwardly flaring base portion 4. The latter is provided with an outwardly extending lower rim 5 from which there extends downwardly an inwardly beveled flange 6 to fit within the top part of a base pan or trough 7. (See Figure 1.)

The side wall of the base pan or trough 7, which inclines outwardly from its base, has formed on its upper exterior part locking projections 8, 8 for engagement by the free ends of hook links 9 which are hingedly secured at their other ends to the outwardly flaring portion 4 of the tank 1. By means of these links 9, which are adapted to be brought over the rim 5 of the portion 4 of the tank, it is possible to lock the latter firmly on the trough 7.

Provided in the tank 1, and projecting inwardly therefrom around the line where the outward flaring portion 4 of the tank begins, is a downwardly inclined partition 10. The latter has a central hole that extends downwardly through a tubular part 11 having an outwardly flaring lower end 12 that forms a valve seat for a valve 13 formed of rubber or like material on the middle top portion of a float 14. This float, which is preferably made of two pieces of metal in the form of a clam-shell, is adapted to be inserted in the trough 7 below the valve seat 12, and has a guide rod 15 which projects upwardly through the tubular part 11 of the partition 10. Fitted in this tubular part 11 is a guide piece 16 having a central hole through which the guide rod 15 freely projects as well as through a central hole formed in a second guide piece or bar 17 that is mounted upon the partition 10 above its tubular part. (See Figures 1 and 2.)

Liquid feed, such as buttermilk, when poured into the tank 1, will descend through the tubular part 11 of the partition 10 into the trough 7 where it will raise the float 14 to bring the valve 13 against the seat 12 to stop the flow of liquid into the trough when the latter has been filled. Formed in the lower part of the outwardly flaring portion 4 of the tank 1, is an annular series of holes 18 through which fowls such as small chickens may project their heads a sufficient distance to eat the feed within the trough. When the feed is in liquid form, the float 14 will automatically fall below the valve 12 as said liquid is consumed, to admit more to the trough.

Now, if it is desired to feed the poultry dry food, the trough 7 may be easily detached from the tank 1 and the float 14 withdrawn. In its place a dry feed cone 19 may be inserted, as indicated by the dotted lines in Figure 1. This cone also has a guide rod, which is designated by the numeral 20 and which is adapted to project upwardly through the guide pieces 16 and 17 and like the guide rod 15. When the dry feed such as a mash is poured into the tank 1, it will descend along the downwardly inclined partition 10 into and through its tubular part 11, upon the dry cone 19 which will make it accessible to the chicks when they thrust their heads through the holes 18.

It will now be seen that I have provided a device which may be easily carried from place to place to feed poultry either liquid or dry feed in a convenient and economical manner. The trough 7 may be easily detached from the tank 1 to permit the substitution of a dry feed cone for the float, in order that dry, instead of liquid feed may be effectively dispensed to the fowls.

I do not wish to be limited to the details of construction and arrangement herein shown and described, and any changes or modifications may be made therein within the scope of the subjoined claims.

Having described my invention, I claim:

1. A device of the type described comprising a tank, a partition in the latter having a downwardly projecting tubular part, a trough secured to the bottom portion of the tank to receive feed poured into the top of the latter, said tank provided around its lower portion with holes through which fowls may project their heads to feed from the trough, a float within the trough, and a valve on the float adapted to engage the lower end of the tubular part of said partition to shut off the flow of liquid to the trough when the latter is filled.

2. A device of the type described comprising a tank having an outwardly flaring base portion, a partition within the tank inclining downwardly from the inner wall of the latter to a vertical tubular part, a trough removably secured to the bottom of the tank, the tank having an annular series of holes in its side wall just above the trough to permit poultry to feed from the latter through said holes, a removable float in said trough, a valve on said float adapted to engage the lower end of the tubular part of said partition, a rod projecting upwardly from said valve, and guiding means for said rod carried by the partition.

In testimony whereof I have hereunto set my hand this 5th day of June, 1924.

DANIEL DE ANGULO.

Witness:
HOWARD S. SMITH.